March 25, 1952 — E. J. JONES — 2,590,626
TENSION YOKE FOR COMPRESSION LOAD WEIGHING UNITS
Filed Feb. 3, 1949 — 2 SHEETS—SHEET 1

INVENTOR
EDGAR J. JONES
BY
ATTORNEY

March 25, 1952   E. J. JONES   2,590,626
TENSION YOKE FOR COMPRESSION LOAD WEIGHING UNITS
Filed Feb. 3, 1949   2 SHEETS—SHEET 2

INVENTOR
EDGAR J. JONES
BY
ATTORNEY

Patented Mar. 25, 1952

2,590,626

UNITED STATES PATENT OFFICE 2,590,626

TENSION YOKE FOR COMPRESSION LOAD WEIGHING UNITS

Edgar J. Jones, Cambridge, Mass., assignor to Baldwin-Lima-Hamilton Corporation, a corporation of Pennsylvania Application February 3, 1949, Serial No. 74,378

8 Claims. (Cl. 73—141)

1

This invention relates generally to apparatus for weighing tension loads and more particularly to a tension type yoke for utilizing a compression load sensitive element.

Various types of tension yokes for compression sensitive elements have been heretofore proposed and used but the same have been deficient in various respects either structurally, functionally, or economically. This has been particularly true in connection with crane scale weighing equipment for foundries, machine shops, etc., where large and heavy castings and machine components or completely fabricated machines are the principal items to be weighed. The very nature of such work and the environment of the shops in which it is made is conducive to relative rough usage of the weighing apparatus. It is also necessary to have the weighing apparatus of sufficiently small size and weight that it may be easily manually carried to the crane or to the location where a tension load is to be weighed. These requirements are further aggravated by the need for a high degree of accuracy and low cost manufacture.

One object of my invention is to provide an improved load weighing tension yoke, for utilizing a compression load sensitive element, that is rugged, compact, readily portable and relatively inexpensive in its manufacture and maintenance, combined with a high degree of accuracy.

Other objects and advantages will be more apparent to those skilled in the art from the following description of the accompanying drawings in which.

In the specific embodiment of the invention which is disclosed herein for purposes of illustration, I have shown a compression sensitive element in the form of a load cell 1 generally shown in the copending application of Arthur C. Ruge, Serial No. 654,246, filed March 14, 1946, now Patent No. 2,472,047, although any other suitable form of compression sensitive unit may

Figure 1:
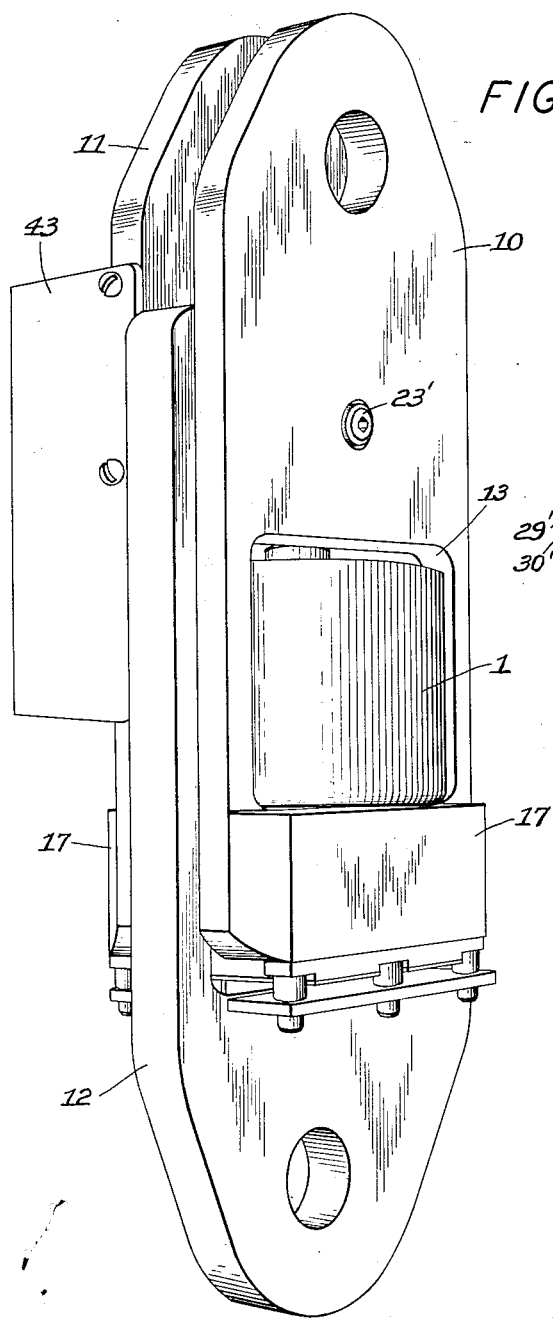
Fig. 1 is a perspective of my improved load weighing device.
Figure 2:
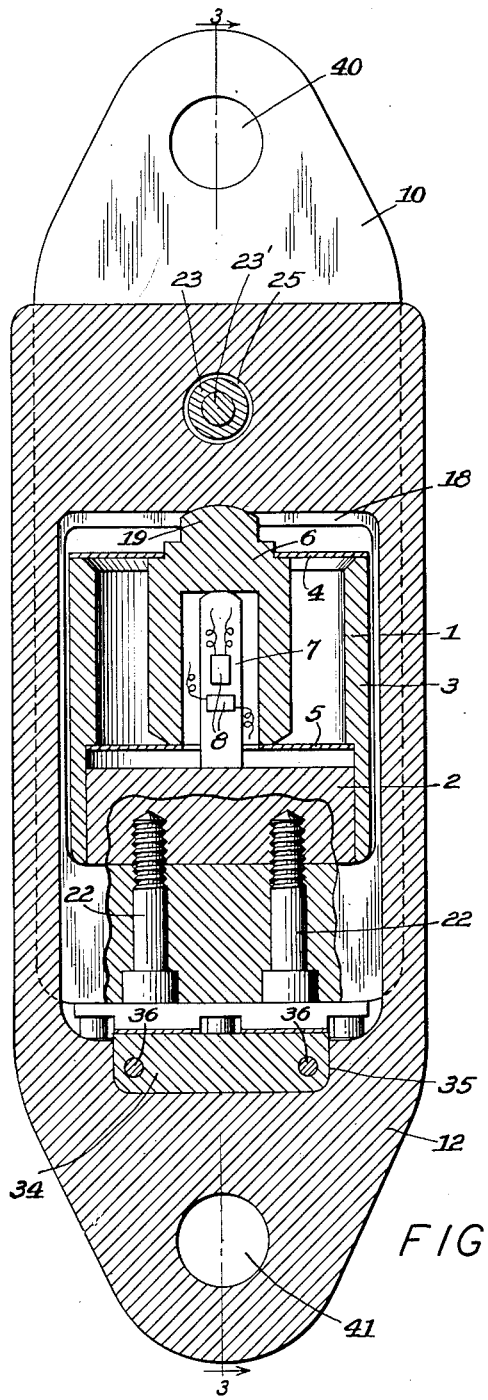
Fig. 2 is a vertical section taken substantially on the line 2—2 of Fig. 3 with certain portions additionally broken away to show certain details of construction.
Figure 3:
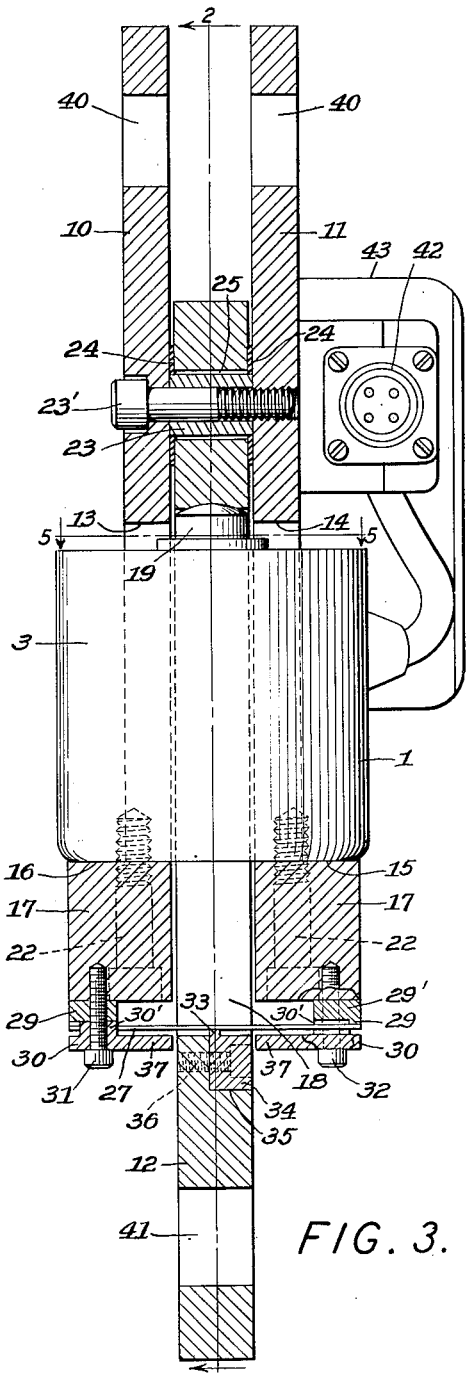
Fig. 3 is a vertical transverse section taken substantially on the line 3—3 of Fig. 2 showing the compression load cell in elevation.

2 be employed. Inasmuch as the load cell, per se, does not constitute a part of my present invention, except as it forms an element of my complete combination, it will suffice to describe the cell as having a base 2 and an integral cylindrical shell 3 connected by annular diaphragms 4 and 5 to a load transmitting member 6. This member in turn acts downwardly on a strain sensitive compression column 7 which rests on base 2 and which has mounted on its surface strain responsive electrical impedance means 8 preferably of the bonded wire strain gage type as shown in Simmons Patent No. 2,292,549. My improved yoke for allowing the compression load cell to weigh tension loads, comprises two outer flat links 10 and 11 and an inner flat link 12. These link members by being flat may be formed economically of plate material which lends itself to a high degree of ruggedness, together with compactness by reason of the flat plates being readily nested, in adjacent side by side or overlapping relation to each other, as is particularly shown in Figs. 1 and 3. The plates have transversely aligned openings 13, 14 and 18 for receiving the load cell, while the lower ends 15 and 16 of the outer plate openings 13 and 14 preferably terminate in a broad surface formed on the plates by bosses 17 extending laterally from the plates. These bosses may be welded on to structural plate material forming the body of the plate links 10 and 11, or a single thick piece of material may be suitably machined to form the thinner link section leaving the heavier lower portion to form the bosses. The opening 18 of the inner plate 12 has its upper end, as shown in Figs. 2 and 3, engaging a preferably rounded button 19 of the load transmitting member 6, while the lower portion of the opening extends down, as shown in Fig. 3, beneath the lower ends of the bosses 17. The width of openings in the plates are of just sufficient size to conveniently receive the cylindrical form of the load cell which is rigidly secured to the outer tension plates by cap screws 22 extending upwardly through the bosses 17. The base of the cell, as seen, is supported on the two outer plates by spanning across the opening of the center plate 12 whereas the upper end of the cell has means, in the form of button 19, to engage the center plate.

Figure 4:
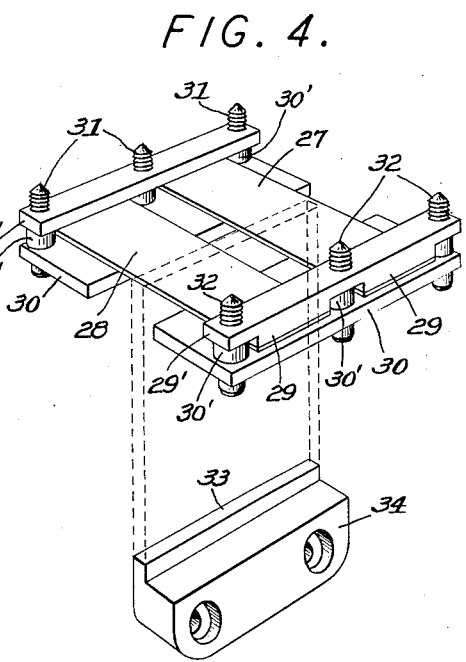
Fig. 4 is a partially exploded perspective of the flexible stayplate construction used for maintaining certain parts in operative relation.
Figure 5:
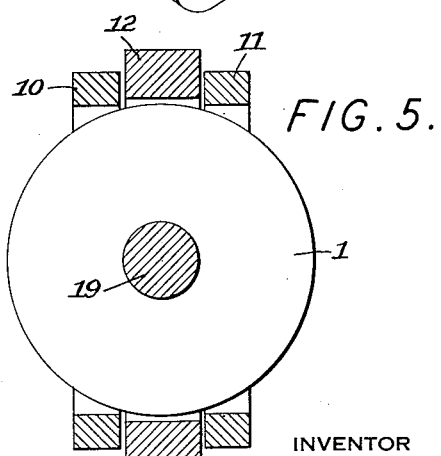
Fig. 5 is a section on line 5—5 of Fig. 3.

In order to hold the upper ends of the plates in operative relation to each other while still allowing free relative vertical movement between the same, I provide a stud 23', Fig. 3, threaded into plate 11 and having suitable shoulders for engaging only the outer plates to define the proper spacing for the same. Interposed between the inner and outer plates are washers 24 of any suitable material such as rubber, fiber or metal, but in any event, of only such thickness as to insure complete freedom of relative vertical movement between the plates. An opening 25, through which a spacer collar 23 and a clamping stud 23′ passes, is formed in the inner plate of larger diameter than the collar, thereby to serve as a safety limit stop while at the same time allowing sufficient space for vertical movement of the plate during its normal loading. The stud 23′ can be tightened to clamp the side plates 10 and 11 against the collar 23 and thus hold these elements in firm relation to each other. To maintain the lower portions of the tension links in lateral relation, I have provided a set of flexure plates 27 and 28, Figs. 3 and 4, specifically shown as two in number, although a smaller or larger number may be employed if desired. These flexure plates extend transversely of the tension links and are silver soldered to projecting edges 29 of a pair of mounting strips 29′ at the bottom of each outer link. These mounting strips are secured to bosses 17 by a series of studs 31 and 32. The flexure plates extend through the lower portion of opening 18 in the center tension plate and are secured thereto by being suitably welded or otherwise integrally attached to a relatively narrow ridge 33 of a member 34 which is inset into a suitable recess 35 formed in the center tension plate. Member 34 is secured to the center tension plate preferably by a pair of studs 36. The flexure plates will firmly prevent relative lateral movement between the lower ends of the outer plates and the center plate, but at the same time will allow free relative vertical movement between such members. While the elastic flexure plates do of course carry a small part of the total load applied to the device, the vertical movement is "free" in the sense of being devoid of all friction. As a matter of protecting the relatively thin flexure plates from damage as by being hit from below, the plate guards 30, having a series of bosses 30′ brazed thereto on the upper side, are positioned beneath the flexure plates and held in place by studs 31 and 32 passing axially through said bosses, the plate guards being separated from the flexure plates a suitable distance to permit the free bending of the flexure plates and terminating very closely to center plate 12. These plate guards perform the additional function of a lateral limit stop in case the device should be severely hit on its side. It will be understood that when a device of this type is used particularly for crane scales, it is apt to be subjected to very severe and rough usage due to swinging from a crane hook which may result in the device hitting a large casting sideways. Also such equipment is usually thrown into a tool crib without due regard for its instrument measuring character. The terms lateral and vertical are relative inasmuch as the device may be used either vertically or horizontally.

Instead of employing a second set of flexure plates above the load cell, I rely upon the engagement of the cell with the center plate 12 to provide lateral positioning of the center plate. These plates 10 and 11 are rigidly positioned by virtue of their attachment to the cell base, while the button 19 bearing in the indentation in plate 12 serves to position plate 12 relative to plates 10 and 11 in the same broad equivalent manner as flexure plates. Hence the possible use of flexure plates in this relation are considered to be within the scope of the claims hereof.

Any suitable adaptors can be employed to connect the tension plates to a crane hook or to an object to be weighed, but as these adaptors will vary with the different types of work, it will suffice to point out that the links are provided with suitable pin openings 40 and 41 or other means of load transmission. The electrical connections from the strain gages 8 may be provided with a suitable terminal connector 42 mounted on the side of one of the outer plates such as 11, while a protective shield or cover 43 may be secured to the tension link and extended around two sides of the connector.

In operation, after the tension link is connected by a suitable pin through openings 40 to a crane hook and to a load at the bottom by a pin through opening 41, the inner plate 12 will move downwardly relative to the outer plates when load is applied and thereby transmit a force to the load cell button 19 which will compress strain sensitive column 7 and transmit its force to the load cell base 2 and thence to the bosses 17 and 18 of the outer plates 10 and 11. The flexure plates 27 and 28 will maintain the lower portion of the outer plates in spaced relation to the inner plate 12 while allowing frictional freedom in the vertical movement of the parts thereby insuring not only a high degree of accuracy and sensitivity, but also maximum stability and ruggedness.

From the disclosure herein, it is seen that the flat plate links of my improved tension yoke inherently have a high degree of ruggedness and compactness, as well as being economical in manufacture consistent with the degree of ruggedness and other qualities which are desired in a device of this type. It will be understood that the tension weighing device comprising the three flat links can be normally sold separate from the load cell and to this extent constitutes by itself a sub-combination or article of manufacture although the cell and linkage together also comprise a complete combination.

It will, of course, be understood by those skilled in the art that various changes may be made in the construction and arrangement of parts without departing from the spirit of the invention as set forth in the appended claims.

I claim:

1. A load weighing device adapted to carry tension loads comprising a plurality of adjacent tension plate links having edge surfaces and flat sides, the flat sides of all the plates being disposed in planes parallel to each other and in overlapping relation to each other, and said plates having transversely aligned openings through which a straight line can extend substantially normal to all of said flat sides, said openings being adapted to receive and to permit the plate links to engage a compression type load sensitive element so that said sensitive element is compressed by a tension load applied to the opposite ends of adjacent links.

2. The combination set forth in claim 1 further characterized in that one link comprises a single member and another of the links comprises two members located on opposite sides of said single member.

3. The combination set forth in claim 1 further characterized in that the load sensitive element is in the form of a load cell having a base and one of said links has a lateral boss for supporting the base of the load cell.

4. The combination set forth in claim 1 further characterized by the provison of transversely extending flexure means connected to each of the links for holding said links in laterally spaced relationship while allowing the same to have frictionless relative axial movement.

5. The combination set forth in claim 1 further characterized by the provision of transversely extending flexure stayplates connected to the adjacent plates for holding the same in lateral relation to each other while allowing frictionless vertical movement relative to each other.

6. The combination set forth in claim 1 further characterized in that one of the links comprises a single member and another of the links comprises a pair of members disposed respectively on each side of the single member, and transversely extending flexure plates connected at their outer ends to the outside link plates and connected at their center to said single link plate.

7. The combination set forth in claim 1 further characterized in that one of the links comprises a single member and another of the links comprises a pair of members disposed respectively on each side of the single member, and transversely extending flexure plates connected at their outer ends to the outside link plates and connected at their center to said single link plate, and a pin secured to the outer plates and extending through an enlarged opening in the single plate and a spacer disposed about said pin to space the outer plates and washers between said inner and outer plates to maintain the links in a predetermined lateral relation.

8. A load weighing device comprising, in combination, a relatively flat plate link and a pair of flat plate links, located on each side of said other link in parallel overlapping relation thereto, all of said links having transversely aligned openings, and a load cell disposed in said openings, said cell being engaged by the walls of said openings by having a base spanning across the inner link and supported on each of the pair of outside links, and means on the other end of the load cell for engaging said center link.

EDGAR J. JONES.

REFERENCES CITED

The following references are of record in the file of this patent:

UNITED STATES PATENTS

| Number | Name | Date |
| --- | --- | --- |
| 2,053,560 | Janovsky | Sept. 8, 1936 |
| 2,180,176 | Stone | Nov. 14, 1939 |
| 2,285,580 | Hanson | June 9, 1942 |
| 2,472,047 | Ruge | May 31, 1949 |